March 2, 1954
A. G. AVILA
2,670,888
DOUGH PANNING MACHINE
Filed Jan. 19, 1948
4 Sheets-Sheet 1
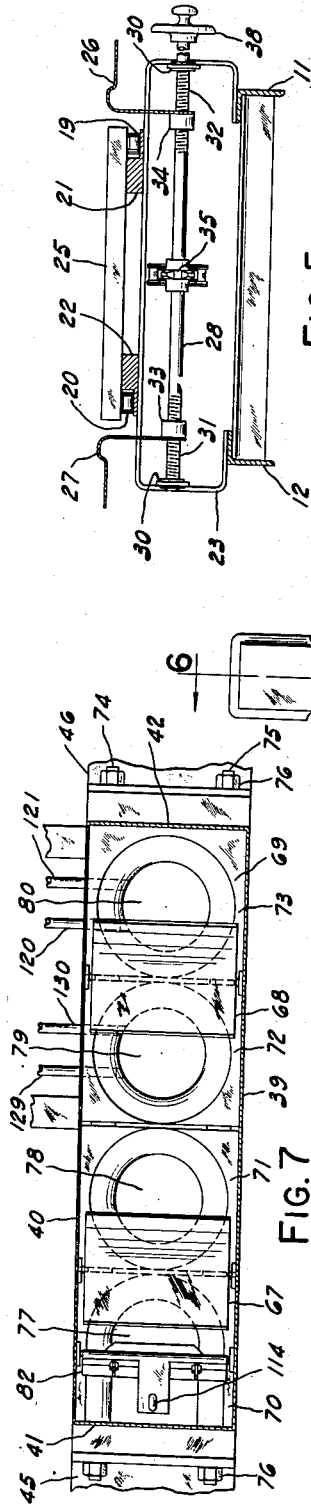
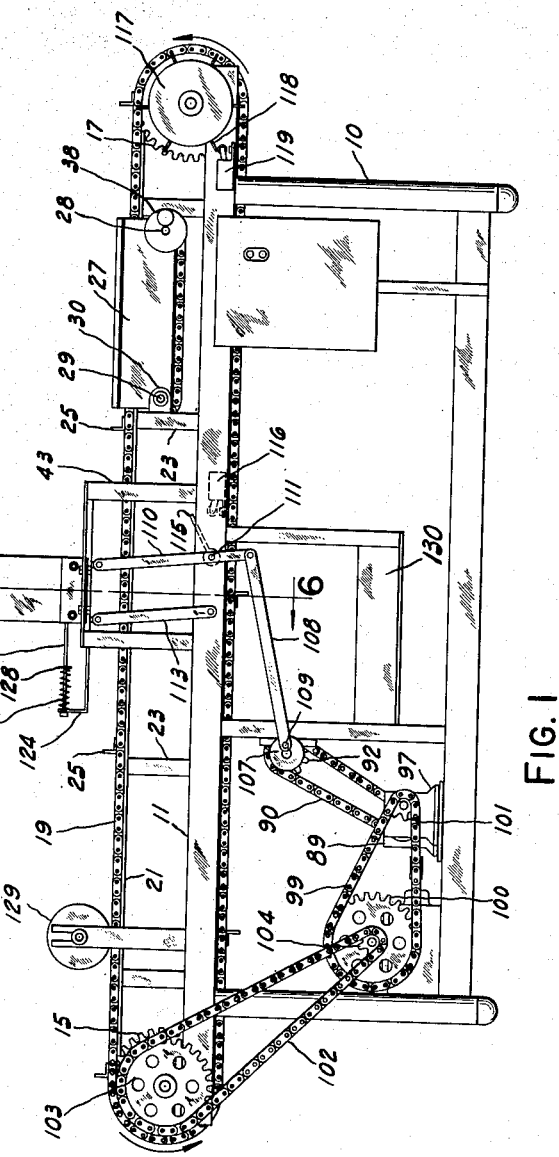
INVENTOR.
A.G. AVILA
BY
Otto Maelli
ATTORNEY March 2, 1954  A. G. AVILA  2,670,888
DOUGH PANNING MACHINE
Filed Jan. 19, 1948  4 Sheets-Sheet 2
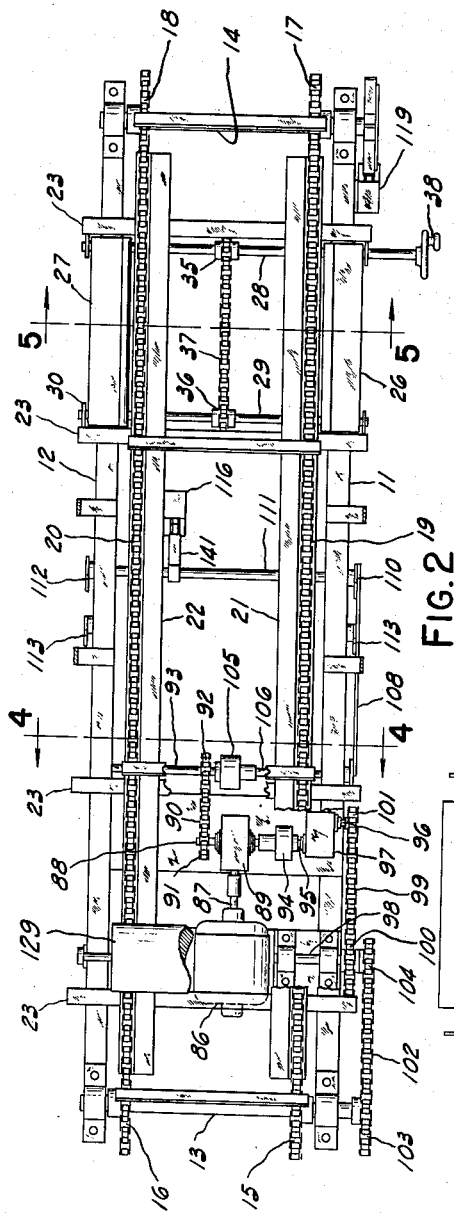
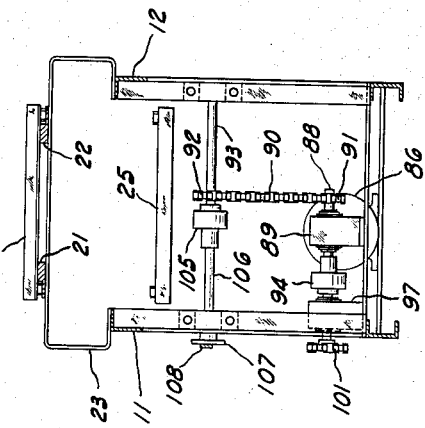
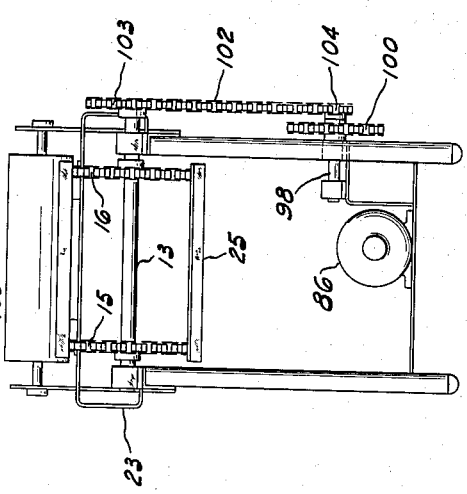
INVENTOR.
A.G. AVILA
BY Otto Moeller
ATTORNEY

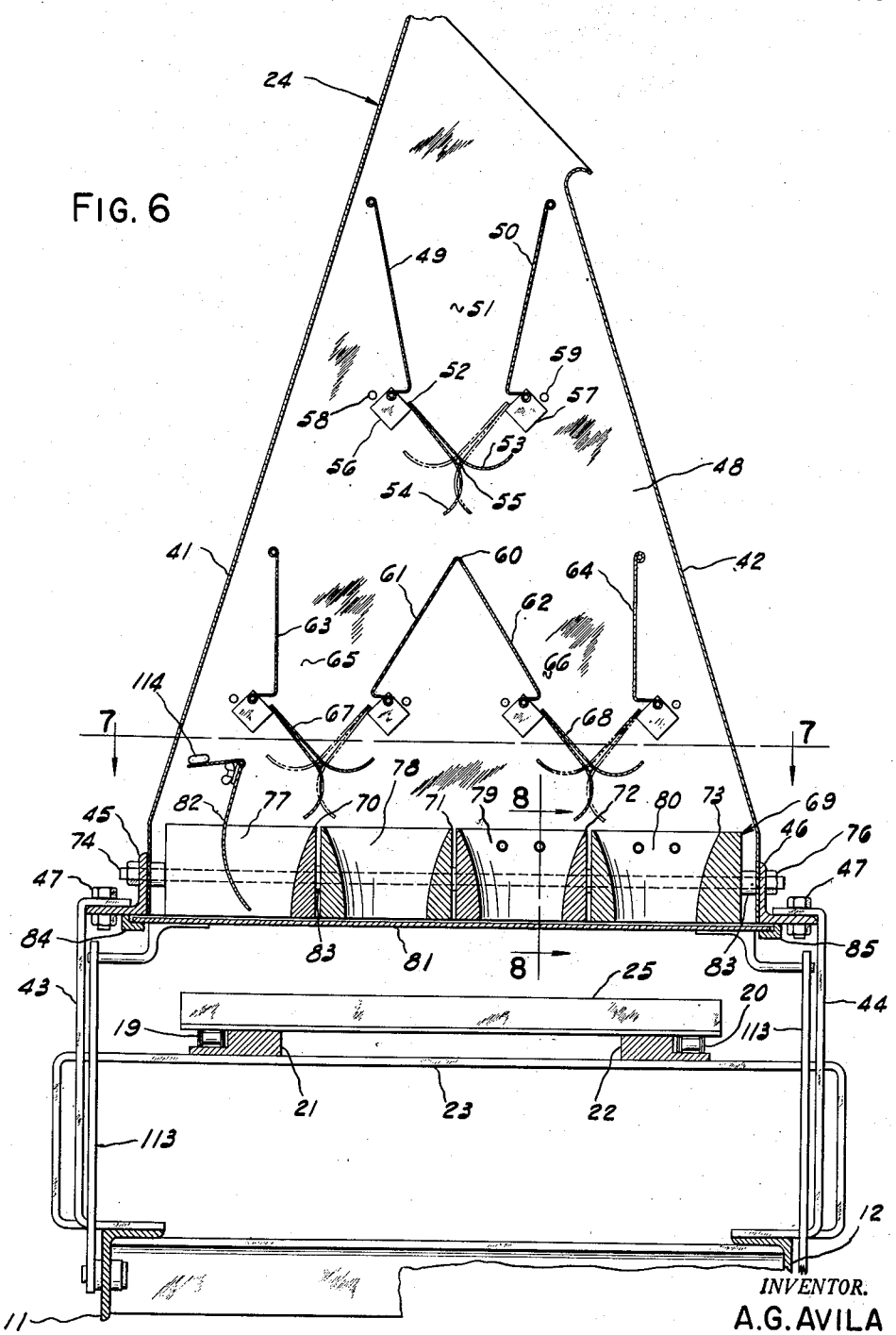

March 2, 1954
A. G. AVILA
2,670,888
DOUGH PANNING MACHINE
Filed Jan. 19, 1948
4 Sheets-Sheet 4
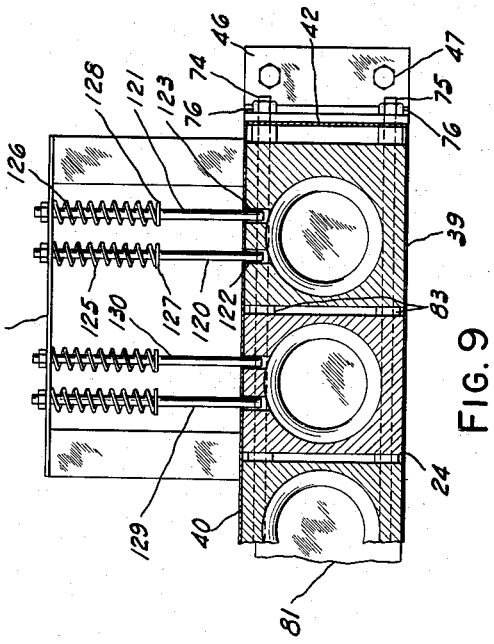
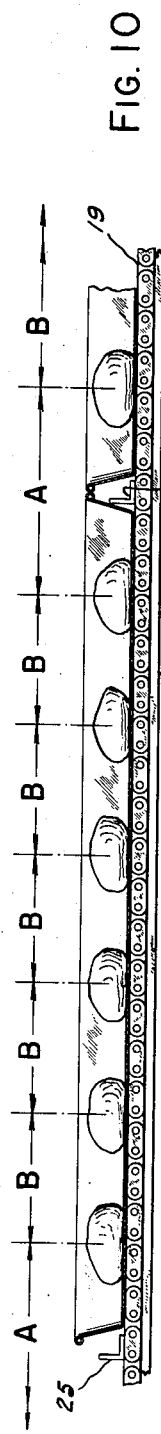
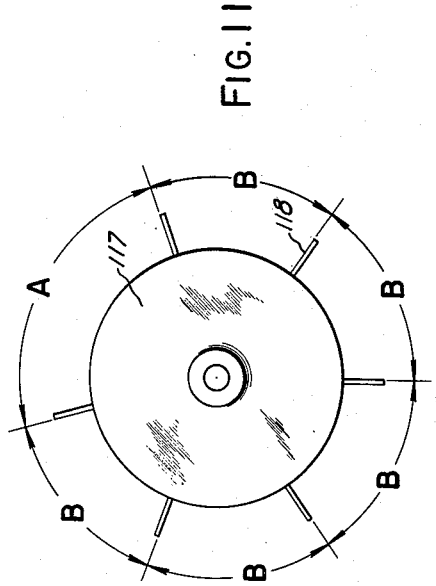
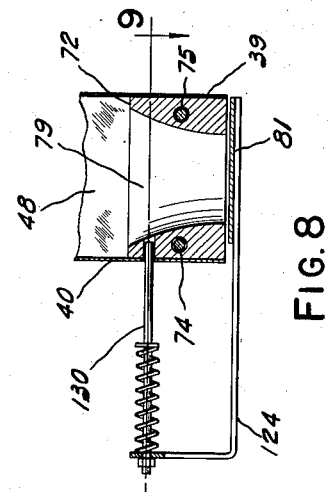
INVENTOR.
A. G. AVILA
BY
Otto Moeller
ATTORNEY Patented Mar. 2, 1954

2,670,888

UNITED STATES PATENT OFFICE 2,670,888

DOUGH PANNING MACHINE

Abelardo G. Avila, York, Pa., assignor to Read Standard Corporation, a corporation of Delaware Application January 19, 1948, Serial No. 3,085

9 Claims. (Cl. 226—14)

This invention relates to depositing mechanism and more particularly to bakery machinery for depositing dough pieces on receiving means, such as baking pans.

An object of the invention is to provide a high speed machine that will accurately deposit dough pieces on baking pans in predetermined positions with respect to the pans and with respect to each other, and that is particularly adapted for panning of rounded dough pieces with a minimum of dislocation. In order to provide for proper location, for example, of hamburger roll dough balls on pans, it has previously been necessary to pan them by hand, and an object of the present invention is to accurately pan rounded dough pieces mechanically with a minimum of dislocation thereof from predetermined positions on the pan.

Another object of the invention is to provide an improved machine of this type that will deposit successive rows of dough pieces on receiving means, such as baking pans, with a minimum of dislocation.

Another object is to provide a panning machine of the type described wherein the depositing means and the pan advancing means are so synchronized that a plurality of equally spaced rows of dough pieces are deposited on a pan, a row at a time.

Another object is to provide a panning machine of the type described in which the depositing means and the pan advancing means are so synchronized that the dough pieces are identically positioned on successive pans regardless of the "skip" distance between successive pans.

Still another object of the invention is to provide a dough piece distributing and depositing mechanism for translating a single row of continuously on-coming dough pieces into successive transverse rows and depositing successive rows in spaced relation on successive on-coming pans.

Other objects and advantages will be apparent from the following description and the accompanying drawings, illustrating one embodiment of the invention.

In the drawings—

Figure 1 is a side elevation of the novel machine;

Figure 2 is a plan view of the machine with the dough piece distributor and depositor removed and other parts broken away;

Figure 3 is an end elevation looking at the machine from the left side of Figure 1;

Figure 4 is a sectional view taken on the line 4—4 of Figure 2;

Figure 5 is a sectional view taken on the line 5—5 of Figure 2;

Figure 6 is a sectional view taken on the line 6—6 of Figure 1;

Figure 7 is a sectional view taken on the line 7—7 of Figure 6;

Figure 8 is a sectional view taken on the line 8—8 of Figure 6;

Figure 9 is a fragmentary sectional view taken on the line 9—9 of Figure 8;

Figure 10 is a view of a portion of the pan conveying chain with one pan and a portion of another shown in longitudinal vertical section, illustrating the spacing between the dough pieces carried by the pans; and Figure 11 is a view in elevation of the indexing means of the pan conveyor, illustrating the relation of the spacing between the indexing pins and the spacing between the dough pieces of Figure 10.

Although the invention is applicable to the depositing of materials other than dough, for convenience in describing the invention, the machine itself will be referred to and described as a dough panning machine and the material to be deposited is hereinafter referred to as dough pieces.

Referring particularly to Figures 1 to 4, the dough panning machine includes a suitable frame 10 for supporting the operating mechanism, that shown being of generally rectangular form made up of suitable upright corner posts and longitudinally and transversely extending connecting members providing a rigid skeleton-like structure.

The longitudinally extending upper side members 11 and 12 of the frame 10, preferably in the form of angle irons, carry at their opposite ends the transversely extending shafts 13 and 14. On the shaft 13 between the frame members 11 and 12 is mounted a pair of spaced sprockets 15 and 16, and similarly, on the shaft 14 between the frame members 11 and 12 is mounted a pair of spaced sprockets 17 and 18. The sprockets 15 and 17 carry an endless chain 19 and the sprockets 16 and 18 carry an endless chain 20, as best shown in Figure 2.

The upper runs of the endless chains 19 and 20 travel along the longitudinally extending rails 21 and 22, respectively. A series of cross bars 23, bent into a generally rectangular open bottom shape and secured to the frame members 11 and 12 in an upright position, support the rails 21 and 22.

When viewing the panning machine as shown in Figure 1, the endless chains 19 and 20 travel in a counterclockwise direction. The empty pans are placed on the chains at the right side of the machine, whence they pass beneath the dough ball distributor 24, and the filled pans are removed at the left side of the machine. In order that the pans may be properly positioned longitudinally on the chains 19 and 20 to insure the proper spacing of the rows of dough balls from the front and rear edges of the pans and the proper spacing between successive pans, transversely extending guide bars 25 are suitably secured on the chains 19 and 20. Since the guide bars 25 are secured to the chains 19 and 20, they serve to push the pans forwardly as the chains travel about the sprockets.

To insure proper lateral positioning of the pans on the chains 19 and 20, longitudinally extending laterally spaced guide plates 26 and 27 are provided at the pan loading end of machine. The guide plates 26 and 27 are preferably laterally adjustable so that pans of different widths, within certain limitations of course, may be accommodated.

For this purpose a pair of longitudinally spaced, transversely extending shafts 28 and 29 are rotatably mounted in any suitable manner, preferably, as best shown in Figures 2 and 5, in brackets 30 which are rigidly secured to the upright portions of two adjacent cross bars 23. The shaft 28 is provided adjacent its opposite ends with the oppositely threaded portions 31 and 32. Threaded members 33 and 34, as clearly shown in Figure 5, are securely attached or formed with the guide plates 26 and 27, respectively, and engage the threaded portions 31 and 32, respectively. The shaft 28, as shown in Figures 1 and 2, is disposed at one end of the guide plates 26 and 27, while the shaft 29 is disposed at the other end of the guide plates 26 and 27. While not shown, it is understood that the shaft 29 is provided with oppositely threaded portions similar to the threaded portions 31 and 32 of the shaft 28, and engages threaded members, similar to the threaded members 33 and 34, which are attached to or formed with the guide plates 26 and 27.

Mounted on the shafts 28 and 29 intermediate their ends, are sprockets 35 and 36, respectively, about which sprockets is trained a sprocket chain 37. A handwheel 38 is mounted on an extension of the shaft 28 for turning shaft 28, and at the same time turning the shaft 29 through the described chain and sprocket connection. Thus by turning the handwheel 38 in one direction, the guide plates 26 and 27 will, through the mounting arrangement thereof on the oppositely threaded portions of the shafts 28 and 29, as described above, move toward one another, while turning the handwheel 38 in the opposite direction will move the guide plates 26 and 27 away from each other. A laterally adjustable guide arrangement is thus provided whereby pans of different widths may be accommodated.

It is evident that a single shaft intermediate the ends of the guide plates 26 and 27 could be employed instead of the two shafts 28 and 29 as illustrated, the latter is preferred, however, since it provides a more rigid construction with less tendency for the guide plates to become cocked or twisted.

Referring particularly to Figures 1, 6 and 7, the dough ball distributor 24 comprises a pair of parallel transversely extending upright walls 39 and 40 and a pair of upwardly converging end walls 41 and 42, forming a housing 48 generally triangular in transverse cross section open at top and bottom. While the housing 48 is shown as entirely enclosing the distributor 24, except for the open top and bottom, it is apparent that the housing may be in the form of a skeleton-like frame work to provide greater accessibility to the interior of the distributor 24. The distributor 24 is disposed between the pan receiving and pan unloading ends of the panning machine, with the bottom of the distributor spaced above the upper run of the chains 19 and 20 that carry the baking pans. It is supported in this position from the frame 10 by means of the brackets 43 and 44 which are secured in any suitable manner to, and extend upwardly from, the longitudinally extending frame members 11 and 12. Any suitable means, such as the angles 45 and 46, may be employed for rigidly securing the lower end of the distributor 24 to the upper ends of the brackets 43 and 44, as best shown in Figure 6. The angles 45 and 46 may be welded to the lower end of the distributor 24 and secured to the brackets 43 and 44 by bolts 47.

Within the upper end of the distributor housing 48 are a pair of upwardly diverging longitudinally extending fixed guide plates 49 and 50. The guide plates 49 and 50 extend from one transverse wall 39 to the other transverse wall 40 of the housing 48 and form a passageway 51 for the dough balls entering through the open upper end of the distributor 24. Beneath the lower end of the passageway 51 formed by the fixed guide plates 49 and 50 is a pivotally mounted deflector 52. The deflector 52 is in the form of a pair of generally J-shaped plates 53 and 54 arranged back to back and extending longitudinally between the transverse walls 39 and 40 of the distributor housing 48. The pivot 55 of the deflector 52 is disposed between the ends and below the center of gravity of the deflector 52 so that it will flop to one side or the other of its upright position.

Since the pivot 55 is disposed below and equidistant between the fixed guide plates 49 and 50 as clearly as shown in Figure 6, it is apparent that with the deflector 52 in the position shown in full lines, a dough ball dropping through the passageway 51 will be deflected to the right by the J-shaped plate 53 of the deflector 52, and with the deflector 52 in the position shown in dot and dash lines, a dough ball dropping through the passageway 51 will be deflected to the left by the J-shaped plate 54 of the deflector 52. Pivoted cushioning members 56 and 57 which are contacted by the upper end of the deflector 52, prevent the deflector from bouncing away from the position shown in full lines after it is flopped over from the position shown in dot and dash lines, and vice versa. Stop members 58 and 59 arranged to be engaged by the cushioning members 56 and 57, limit the pivotal movement of the deflector 52, so that the upper end of the deflector member 52 is either subjacent the lower edge of the fixed guide plate 49 or subjacent the lower end of the fixed guide plate 50.

Below the deflector 52 is a central fixed guide 60 which in transverse cross section is generally inverted V-shaped and is disposed with the crest thereof in vertical alinement with the pivot 55 of the deflector 52. The sloping side walls 61 and 62 extend longitudinally from one transverse wall 39 to the other transverse wall 40 of the housing 48 and form with the upright side fixed guides 63 and 64, which also extend from one wall 39 to the other wall 40 of the housing 48, passageways 65 and 66 into which the dough balls alternately drop from the deflector 52. Below the passageways 65 and 66 are mounted pivotal deflectors 67 and 68 which are in all respects similar to and function the same as deflector 52.

Disposed in the lower end of the distributor housing 48 is a generally rectangular shaped guide block 69 extending closely from wall to wall of the housing 48. The guide block 69 is preferably formed of individual side by side disposed guide blocks 70, 71, 72 and 73. A pair of spaced transversely extending guide block supporting rods 74 and 75, pass through the guide blocks 70, 71, 72 and 73 and project at one end through the housing wall 41 and angle 45 and at the other end through the housing wall 42 and angle 46, as best seen in Figures 6, 8 and 9. The projecting ends of the supporting rods 74 and 75 are threaded to receive nuts 76 for securing the rods 74 and 75 in place.

The guide blocks 70, 71, 72 and 73 are provided, respectively, with openings 77, 78, 79 and 80 extending vertically therethrough, through which openings the dough balls drop from the deflectors 67 and 68 onto an accumulator plate 81 immediately beneath the guide block 69. The plate 81 is arranged to be intermittently reciprocated, as will appear hereinafter, whereby the dough balls accumulated on the plate are deposited on the baking pans. The openings 78, 79 and 80 are preferably circular in horizontal cross section, while the opening 77 is U-shaped and extends through the side of the guide block 70 in order to receive the pivotally mounted vane 82, the function of which is hereinafter described. The openings 77, 78, 79 and 80 are tapered to present a large opening in the upper end of the guide blocks 70, 71, 72 and 73 to facilitate receiving of the dough balls, and to present a smaller opening in the lower end of the guide blocks to provide more accurate spacing of the dough balls on the accumulator and depositing plate 81.

Referring particularly to Figure 6, it will be seen that the guide blocks 72 and 73 are arranged beneath the deflector 68 with their respective openings 79 and 80, immediately to the left and right, respectively, of the pivot of the deflector 68, so that the dough balls dropping through the passageway 66 will alternately be deflected into the openings 79 and 80. The openings 77 and 78 in the guide blocks 70 and 71 are similarly arranged with respect to the deflector 67, so that the dough balls dropping through the passageway 65 will alternately be deflected into the openings 77 and 78. Suitable spacer collars 83 are mounted on the supporting rods 74 and 75 between the guide blocks and between the end walls of the housing 48 and the guide blocks, in order to accurately position the guide blocks and to provide for limited adjustment thereof.

With the deflectors of the distributor 24, as shown in full lines in Figure 6, a dough ball dropping through passageway 51 will be deflected into the passageway 66 by deflector 52, and will then be deflected into opening 80 of guide block 73 by the deflector 68. The dough ball, upon contacting the deflectors 52 and 68, will flip them over to the position shown in dot and dash. The second dough ball will thus be deflected into passageway 65 and then into opening 78 of guide block 71, and the deflector 52 will be returned to its full line position while the deflector 67 is flipped over to its dot and dash position. The third dough ball will be deflected into passage 66 and then by deflector 68 into opening 79 of guide block 72, while the fourth dough ball will be deflected into passage 65 and then into opening 77 of guide block 70, completing a row of four dough balls resting on the accumulator plate 81.

The accumulator and depositor plate 81 is adapted to move rearwardly from beneath the guide block 69 in slideways 84 and 85, whereupon the row of dough balls drop onto a pan carried by the chains 19 and 20. The plate 81 then moves forwardly beneath the guide block 69 to collect another row of dough balls. The pan is advanced a predetermined distance, the plate 81 again moves rearwardly, and a second row of dough balls are deposited on the pan. These movements are repeated to deposit successive rows of dough balls on one pan after another. The operation of the pan advancing means and the plate 81 and their synchronization is described in detail hereinafter.

A motor 86 mounted in any suitable manner on the frame 10 supplies the motive power for the operating mechanism of the panning machine. Referring particularly to Figures 2 and 4, the drive shaft 87 of motor 86 is in continuous driving relation with driven shaft 88 through the speed reducer 89. A sprocket chain 90 trained over the sprockets 91 and 92, fixed, respectively, on the shafts 88 and 93, provides a continuous drive relation between the shafts 88 and 93.

A magnetic clutch 94 is arranged for selectively engaging a shaft 95 in operative relation or disengaging it from operative relation with the continuously driven shaft 88. The shaft 95 is operatively connected with the shaft 13 for driving the conveyor chains 19 and 20. The operative connection between shaft 95 and shaft 13 includes; a shaft 96 driven from shaft 95 through a speed reducer 97; a shaft 98 driven from shaft 96 by a sprocket chain 99 trained over the sprockets 100 and 101 carried, respectively, by the shafts 98 and 96; and a sprocket chain 102 trained over the sprockets 103 and 104 carried, respectively, by the shafts 13 and 98.

A one revolution clutch 105 is arranged for selectively engaging a shaft 106 in operative relation or disengaging it from operative relation with the continuously driven shaft 93. The shaft 106 is operatively connected with the plate 81 for imparting reciprocatory movement thereto. This operative connection includes a crank disc 107 carried by the shaft 106 and a link 108 pivotally connected at one end to the crank pin 109 of crank disc 107 and pivotally connected at its other end to one end of a lever 110. The lever 110 is fixed between its ends on a transversely extending shaft 111 which is rotatably mounted in the frame members 11 and 12, the shaft 111 constituting the fulcrum about which the lever 110 pivots. The lever 110 is pivotally connected at its other end to one corner of the plate 81. A link 112 is fixed at its one end to the other end of the shaft 111 and is pivotally connected to the opposite corner of the plate 81. Links 113 are preferably provided pivotally connecting the other corners of the plate 81 to the frame members 11 and 12.

In operation, when a dough ball drops through the distributor 24 into the opening 77 of guide block 70, completing a row of dough balls, it deflects the pivotally mounted vane 82 which carries a mercury switch 114. The mercury switch 114 is arranged, in its deflected position, to complete an electric circuit (not shown) which is operatively connected, by any well known suitable means, to the actuating means of the one revolution clutch 105. The clutch 105 connects the shaft 106 with the continuously operating shaft 93, and the operating connections between the shaft 106 and the plate 81 previously described, effect rearward movement of the plate 81, thereby permitting a row of dough balls to drop onto a pan carried by the conveyor chains 19 and 20, and then effect forward movement of the plate 81 into position to accumulate another row of dough balls.

When the lever 110 has moved the plate 81 to its rearmost position, an arm 115 carried by the lever 110 contacts and closes a switch 116 completing a maintained electric circuit (not shown) which is operatively connected, by any well known suitable means, to the magnetic clutch 94. The clutch 94 connects the shaft 95 with the continuously operating shaft 88, and the operating connections between the shaft 95 and the conveyor chains 19 and 20 previously described, effect operation of the chains 19 and 20 for advancing the pans.

Indexing means is provided for breaking the maintained circuit to the magnetic clutch thus stopping the operation of the conveyor chains 19 and 20 when the pan carried thereby has advanced a predetermined distance and is in position to receive a second row of dough balls from the distributor 24. For this purpose, a disc 117 is mounted on the shaft 14 that carries the sprockets 17 and 18 over which are trained the conveyor chains 19 and 20. A plurality of vanes 118 project radially from the circumference of the disc 117, the number of such vanes being equal to the number of rows of dough balls to be deposited on a pan, in the present instance there being six vanes and six rows of dough balls, as shown in Figures 10 and 11. Referring particularly to Figure 10, it will be seen that the distance A between the last row of dough balls in one pan and the first row of dough balls in the next succeeding pan is greater than the distances B between the rows of dough balls on the same pan. The vanes 118 are therefore arranged around the circumference of the disc 117 so that the distances A and B between the vanes, as best shown in Figure 11, are proportional to the distances A and B between the rows of dough balls.

The vanes 118 are arranged to contact a switch 119 which breaks the maintained circuit to the magnetic clutch 94, thereby interrupting the driving relation between continuously operating shaft 88 and the shaft 95 and interrupting operation of the pan advancing mechanism. The pan thus comes to rest beneath the distributor 24 to receive another row of dough balls. The last dough ball in the row again trips the mercury switch 114, which in turn operates the one revolution clutch 105, effecting reciprocation of the plate 81, and depositing of the row of dough balls upon the pan. Reciprocation of the plate 81 again causes arm 115 to contact the switch 116, operating the magnetic clutch 94, whereby shafts 88 and 95 are engaged in driving relation and thereby effecting operation of the pan advancing means. The pan advances until the next vane 118 contacts the switch 119 and the cycle of operation is repeated.

As previously explained, with the pivoted deflectors of the distributor 24 as shown in full lines in Figure 6, the dough balls drop through the openings 80, 78, 79 and 77, in that order. Also as previously explained, the dough ball dropping through opening 77 trips the mercury switch 114, causes the plate 81 to move rearward, thereby permitting the row of dough balls to drop onto the pan, and then causes the plate 81 to return to its original position to receive the next row of dough balls. Now, in order to prevent a second dough ball from dropping through the opening 80 during the reciprocating movement of the plate 81, temporary holding rods 120 and 121 are provided, as best shown in Figures 8 and 9.

The rods 120 and 121 pass through the longitudinally extending transversely spaced openings 122 and 123, in the front wall of the guide block 73. The rods 120 and 121 are operatively connected by a bracket 124 with the plate 81, and with the plate positioned beneath the opening 80, the rods 120 and 121 are withdrawn from the opening 80 permitting dropping of a dough ball therethrough. However, upon rearward movement of the plate 81, the rods 120 and 121 extend through the opening 80, and form a temporary holding means should another dough ball drop from the distributor 24 before the plate 81 has returned to its original position beneath the opening 80.

The rods 120 and 121 pass loosely through the bracket 124 and movement is imparted to the rods through the bracket by means of the springs 125 and 126 mounted on the rods 120 and 121, respectively, between the bracket 124 and the respective collars 127 and 128. There is thus provided a lost motion shock absorbing arrangement when the ends of the rods 120 and 121 strike the rear wall of the guide block 73, thereby preventing distortion of the rods 120 and 121, or the bracket 124.

A similar arrangement of rods 129 and 130 is preferably provided for the guide block 72, since if the pivoted deflector 68 should be in the position shown in dot and dash in Figure 6, while the deflectors 52 and 67 are in the full line position, then the first dough ball of a complete row would drop through opening 79 of guide block 72. Temporary holding means is thus provided irrespective of whether the first dough ball of a row drops through guide block opening 79 or 80.

If desired a dough piece flattening roller 129 suitably supported from the frame 10 above the advancing pans may be employed. A catch pan 130, suitably supported from the frame 10 beneath the distributor 24, is preferably employed, so that if the operator should neglect to place a pan on the pan conveyor, the dough balls dropping from the distributor 24 will be caught in the catch pan 130.

I claim:

1. A dough panning device comprising a vertical distributor for delivering successive falling dough pieces in a succession of transverse rows, a pan conveyor for advancing pans beneath said distributor, a depositing member interposed between said distributor and said pan conveyor disposed to receive dough pieces by gravity from said distributor and for supporting successive single rows of dough pieces, means actuated by the last dough piece of each row delivered onto said member for moving said member from its supporting position to deposit said row of dough pieces on a pan, and means including an indexing element for interrupting operation of said pan conveyor at intervals in predetermined positions for depositing of successive single rows of dough pieces on a pan.

2. A dough panning device comprising a vertical distributor for delivering successive falling dough pieces in a succession of transverse rows, a pan conveyor for advancing pans beneath said distributor, a depositing member interposed between said distributor and said pan conveyor for receiving and supporting successive single rows of falling dough pieces, means actuated by the last dough piece of each row delivered onto said member for moving said member from its supporting position to deposit said row of dough pieces on a pan, means for interrupting operation of said pan conveyor at intervals for successively depositing single rows of dough pieces on a pan, and means actuated by movement of said depositing member out of its dough piece supporting position for restoring operation of said pan conveyor after each depositing operation.

3. A dough panning device comprising a vertical distributor for delivering successive falling dough pieces in a succession of transverse rows, a pan conveyor for advancing pans beneath said distributor, a depositing member interposed between said distributor and said pan conveyor disposed to receive dough pieces by gravity from said distributor and for supporting successive single rows of dough pieces, means actuated by the last dough piece of each row delivered onto said member for moving said member from its supporting position to deposit said row of accumulated dough pieces on a pan, means including an indexing element for interrupting operation of said pan conveyor at intervals corresponding to the distance between successive single rows of dough pieces to be deposited on said pans, and means actuated by movement of said depositing member out of its dough piece supporting position for restoring operation of said pan conveyor after each depositing operation.

4. A dough panning device comprising a distributor for delivering successive dough pieces in transverse rows, a pan conveyor for advancing pans beneath said distributor, a reciprocating depositing member for depositing said transverse rows of dough pieces a row at a time onto said pans, means for imparting reciprocating motion to said depositing member including a one revolution clutch for selective engagement with a continuously driven shaft, a detecting device actuated by the last dough piece of a row delivered by said distributor onto said depositing member for controlling operation of said one revolution clutch to effect reciprocating motion of said depositing member, drive means for said pan conveyor including a clutch for selectively engaging or disengaging a continuously driven shaft, means actuated by said depositing member after each depositing operation for effecting engagement of said last named clutch with said last named continuously driven shaft for operating said pan conveyor, indexing means operatively connected with said pan conveyor, and means controlled by said indexing means for disengaging said last named clutch from said last named continuously driven shaft for interrupting operation of said pan conveyor at intervals corresponding to the distance between successive rows of dough pieces to be deposited on said pans.

5. A dough panning device comprising a distributor for delivering successive dough pieces in transverse rows, a pan conveyor for advancing pans beneath said distributor, a depositing member interposed between said distributor and said pan conveyor for supporting a row of dough pieces, means responsive to the last dough piece of a row delivered onto said member for moving said member from its supporting position to deposit a row of dough pieces on a pan, and an auxiliary support normally out of dough piece supporting position, said support being movable with said depositing member into position for supporting the first dough piece of a succeeding row when said depositing member is moved from its supporting position.

6. A dough panning device comprising a distributor for delivering successive dough pieces in transverse rows, a pan conveyor for advancing pans beneath said distributor, a depositing member interposed between said distributor and said pan conveyor for supporting a row of dough pieces, mechanism for imparting reciprocating motion to said member for moving it from its supporting position to deposit a row of dough pieces on a pan and to its supporting position for supporting a succeeding row of dough pieces, means responsive to the delivery of the last dough piece of a row for effecting operation of said mechanism, and an auxiliary support movable with said depositing member into position for supporting the first dough piece of a succeeding row when said depositing member is moved from its supporting position, and movable out of supporting position when said depositing member is moved into supporting position.

7. A dough piece handling mechanism including a vertical distributor for rearranging continuously traveling dough pieces from a single file into a plurality of files to deliver dough pieces in successive rows, said distributor comprising a pivotally mounted deflector in the path of said single file of traveling dough pieces for deflecting them alternately to opposite sides of the deflector to form a pair of parallel files of traveling dough pieces, and a pivotally mounted deflector in the path of each of said last named files of traveling dough pieces for deflecting them alternately to opposite sides of said last named deflectors to form four parallel files of traveling dough pieces, said deflectors having a pair of divergent vane surfaces meeting in a common edge and being disposed with the common edge uppermost, said deflectors being pivotally mounted below their center of gravity for rocking movement transversely of the path of the falling dough pieces by contact of said dough pieces on opposite sides of said vanes, pendulously mounted stop means at each side of said deflectors adapted to be engaged by the upper end of said deflector vanes for limiting said rocking movement, said pendulously mounted stop means providing cushioning stops for said deflectors a depositing member disposed transversely of said files of traveling dough pieces in position to successively receive a dough piece from each file, and means responsive to delivery of the last dough piece of a row for moving said member from its supporting position to deposit a row of dough pieces.

8. A dough piece handling mechanism including a vertical distributor for rearranging continuously traveling dough pieces from a single file into a plurality of files to deliver dough pieces in successive rows, said distributor comprising a pivotally mounted deflector in the path of said single file of traveling dough pieces for deflecting them alternately to opposite sides of the deflector to form a pair of parallel files of traveling dough pieces, and a pivotally mounted deflector in the path of each of said last named files of traveling dough pieces for deflecting them alternately to opposite sides of said last named deflectors to form four parallel files of traveling dough pieces, said deflectors having a pair of divergent vane surfaces meeting in a common edge and being disposed with the common edge upper-most, said deflectors being pivotally mounted below their center of gravity for rocking movement transversely of the path of the falling dough pieces by contact of said dough pieces on opposite sides of said vanes, pendulously mounted stop means at each side of said deflectors adapted to be engaged by the upper end of said deflector vanes for limiting said rocking movement, said pendulously mounted stop means providing cushioning stops for said deflectors a depositing member disposed transversely of said files of traveling dough pieces in position to successively receive a dough piece from each file, mechanism for imparting reciprocating motion to said member for moving it from its supporting position to deposit a row of dough pieces and to its supporting position for supporting a succeeding row of dough pieces, and means responsive to the delivery of the last dough piece of a row for effecting operation of said last named mechanism.

9. A dough piece handling mechanism including a vertical distributor for rearranging continuously traveling dough pieces from a single file into a plurality of files to deliver dough pieces in successive rows, said distributor comprising a pivotally mounted deflector in the path of said single file of traveling dough pieces for deflecting them alternately to opposite sides of the deflector to form a pair of parallel files of traveling dough pieces, and a pivotally mounted deflector in the path of each of said last named files of traveling dough pieces for deflecting them alternately to opposite sides of said last named deflectors to form four parallel files of traveling dough pieces, said deflectors having a pair of divergent vane surfaces meeting in a common edge and being disposed with the common edge uppermost, said deflectors being pivotally mounted below their center of gravity for rocking movement transversely of the path of the falling dough pieces by contact of said dough pieces on opposite sides of said vanes, pendulously mounted stop means at each side of said deflectors adapted to be engaged by the upper end of said deflector vanes for limiting said rocking movement, said pendulously mounted stop means providing cushioning stops for said deflectors.

ABELARDO G. AVILA.

References Cited in the file of this patent

UNITED STATES PATENTS

| Number | Name | Date |
|---|---|---|
| 467,003 | Ferraioli | Jan. 12, 1892 |
| 771,090 | Pugh | Sept. 27, 1904 |
| 957,390 | Streich | May 10, 1910 |
| 1,312,640 | Mallinckrodt | Aug. 12, 1919 |
| 1,357,476 | Rogers et al. | Nov. 2, 1920 |
| 1,403,053 | Myers | Jan. 10, 1922 |
| 1,474,448 | Scott | Nov. 20, 1923 |
| 1,568,082 | Mitton | Jan. 5, 1926 |
| 1,611,822 | Dulche | Dec. 21, 1926 |
| 1,735,825 | Koch | Nov. 12, 1929 |
| 1,781,546 | Harber | Nov. 11, 1930 |
| 1,890,740 | Marasso | Dec. 13, 1932 |
| 1,896,639 | Meyer et al. | Feb. 7, 1933 |
| 2,008,036 | Pointon et al. | July 16, 1935 |
| 2,036,421 | Luckie | Apr. 7, 1936 |
| 2,066,869 | Wild | Jan. 5, 1937 |
| 2,115,620 | Cave | Apr. 26, 1938 |
| 2,182,079 | Frost | Dec. 5, 1939 |
| 2,277,688 | Cattonar et al. | Mar. 31, 1942 |
| 2,304,379 | Senkbeil | Dec. 8, 1942 |
| 2,337,526 | Steadman et al. | Dec. 21, 1943 |
| 2,438,811 | Sage | Mar. 30, 1948 |

FOREIGN PATENTS

| Number | Country | Date |
|---|---|---|
| 385,035 | Great Britain | Dec. 22, 1932 |